(No Model.) 2 Sheets—Sheet 1.
H. B. DIERDORFF.
MINING MACHINE TRUCK.
No. 558,264. Patented Apr. 14, 1896.
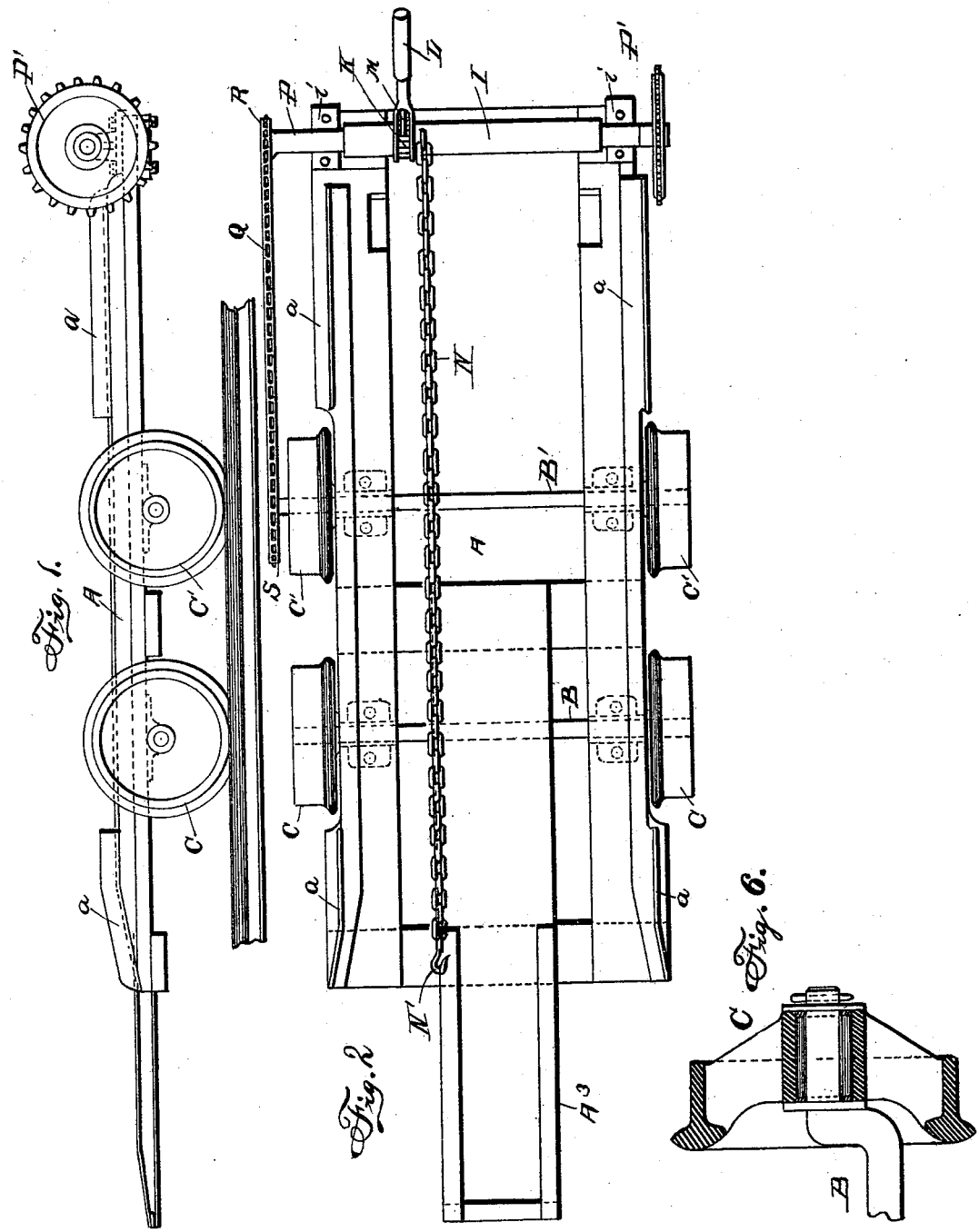

(No Model.) 2 Sheets—Sheet 2.
H. B. DIERDORFF.
MINING MACHINE TRUCK.
No. 558,264. Patented Apr. 14, 1896.
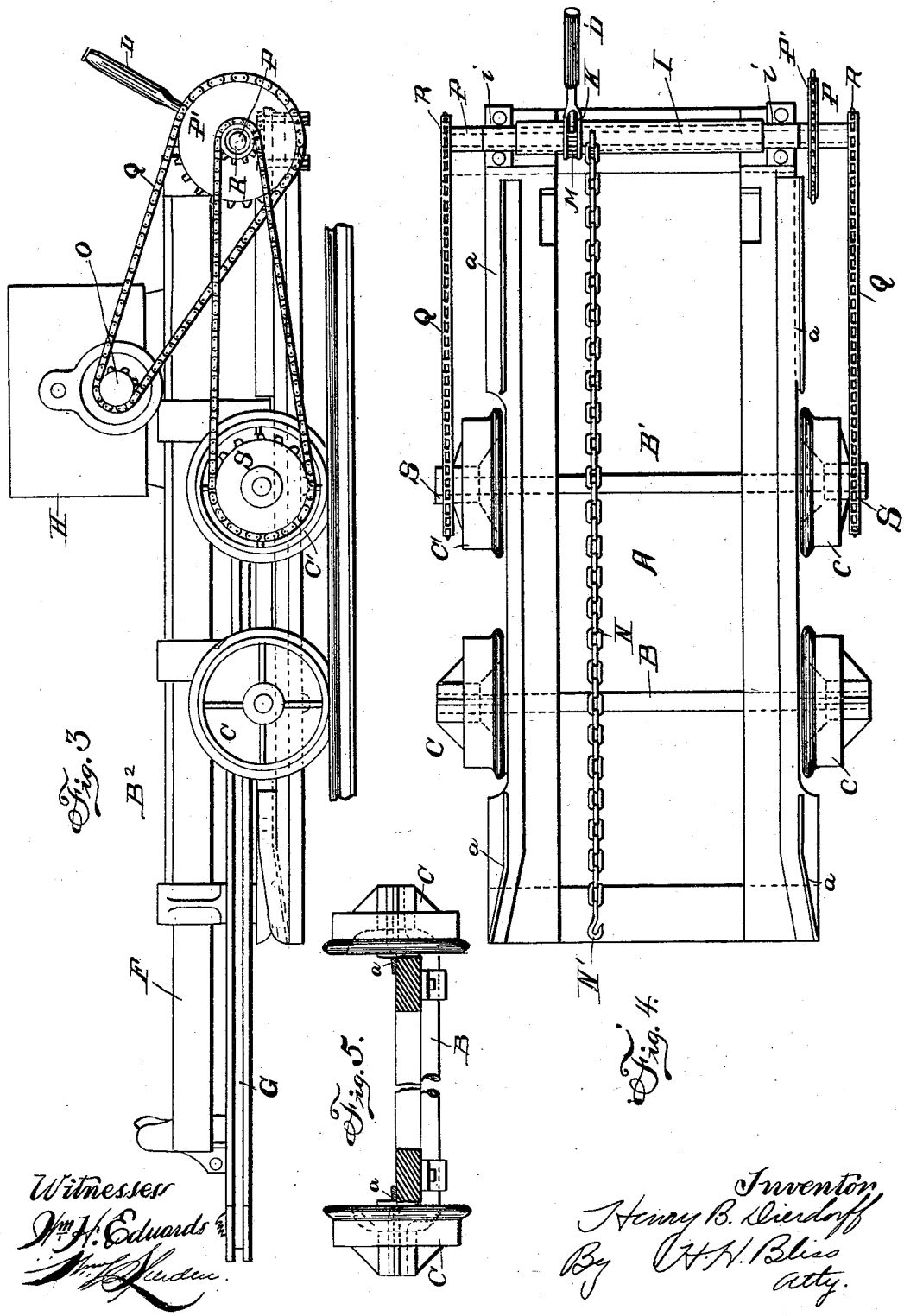

UNITED STATES PATENT OFFICE.

HENRY B. DIERDORFF, OF COLUMBUS, OHIO, ASSIGNOR TO JOSEPH A. JEFFREY.

MINING-MACHINE TRUCK.

SPECIFICATION forming part of Letters Patent No. 558,264, dated April 14, 1896.

Application filed August 30, 1895. Serial No. 561,018. (No model.)

*To all whom it may concern:*

Be it known that I, HENRY BEECHER DIERDORFF, a citizen of the United States, residing at Columbus, in the county of Franklin and State of Ohio, have invented certain new and useful Improvements in Mining-Machine Trucks; and I do declare the following to be a full, clear, and exact description of the invention, such as will enable others skilled in the art to which it appertains to make and use the same, reference being had to the accompanying drawings, and to the letters of reference marked thereon, which form a part of this specification.

Figure 1 is a side elevation of a truck embodying my improvements. Fig. 2 is a plan view thereof. Fig. 3 is a side elevation of a slightly-modified construction, showing a mining-machine in position thereon. Fig. 4 is a plan view of the same, the machine being removed. Fig. 5 is a vertical sectional view on the line $xx$ of Fig. 4. Fig. 6 is a sectional view of one of the wheels.

The object of my invention is to provide a truck specially adapted for transporting mining-machines from place to place. These mining-machines, of which there are many forms, with each of which my improvements are adapted for use, are very heavy, in many instances weighing two thousand or more pounds. They must be frequently transported from one part of a mine to another. Being of great weight, as described, it is a matter of considerable difficulty to get them upon and remove them from the trucks provided and to transport them when mounted upon the truck.

By the use of such a truck as that hereinafter described a mining-machine can be quickly and easily moved upon or removed from the truck and the truck and its load readily moved from place to place, power for accomplishing this last purpose being taken from the engine or motor of the mining-machine.

In the drawings, A indicates, as a whole, the body of the truck. As shown, it is formed of longitudinal side pieces A', connected at the ends and at intermediate points, if desired, by cross-girts $A^2$, to provide a light but strong supporting-frame. This body or frame is mounted upon carrying-wheels C C', mounted on axles B B', the axle B and wheels C being arranged toward the front of the truck and the axle B' and wheels C' in rear thereof.

In the construction shown in Figs. 1 and 2, in which straight axles are employed, the wheels C C' are secured fast to their respective axles, and the rear axle B' is extended at one end beyond the wheel C', and on such projecting end is mounted a sprocket-wheel S.

On the upper side of the body A is formed, by means of angle-irons $a\ a$, a guideway for the purpose of properly guiding the machine which it is desired to transport into proper position thereon.

I is a tubular shaft mounted transversely across the truck, near the rear end thereof, in bearings $i$. It is provided with a ratchet-wheel J and with a collar K, the latter loosely surrounding the shaft and being connected with a handle L. The handle carries a pivoted dog or pawl M, which engages with the teeth of the ratchet J. To this tubular shaft is connected one end of a chain N, the other end of which is provided with a hook N' or other means for engaging with or securing the chain to the rear end of a mining-machine. By means of the handle L and ratchet J the operator can apply multiple power to the shaft I, and through the chain N draw the mining-machine upon the body of the truck. To facilitate this moving of the machine on the truck, the wheels C are mounted considerably back from the forward end of the truck.

As shown in Figs. 1 and 2, the main body A is provided with a forward-projecting portion $A^3$, and the front end of the truck can be tipped down to the ground-line of the rear end of the mining-machine and form a gradual incline up which such machine can be drawn, as above described. After the machine has been arranged in proper position with relation to the truck and started up the incline the power of the shaft I is ample to move it the desired distance.

After the machine is in place upon the truck the latter is set in motion as follows: P is a shaft journaled upon the truck near the rear end, it preferably extending through the tubular shaft I. On this shaft there is secured a sprocket-wheel P', designed to be connected with a sprocket-wheel secured to one of the power-shafts of the motor or engine, and said shaft is connected directly or indirectly with the rear wheels C' of the truck. In the form shown in Figs. 1 and 2 there is a sprocket-wheel R on the shaft P, and this wheel is connected with the aforesaid sprocket S on the rear axle B'.

In many cases, particularly in mining where the vein of coal is thin and the entries and rooms are shallow—sometimes not over two and one-half ($2\frac{1}{2}$) to three (3) feet—it is desirable to have the machine-truck as low as possible, and for such purpose I have provided the form shown in Figs. 3 to 6, in which, instead of having straight axles B B', as in the construction described above, and securing the wheels C C' thereto, I use crank or bent axles and mount the wheels loosely thereon. By this construction the height of the body of the truck from the ground is materially lessened, and it is not necessary to provide the truck with the forward-extending portion $A^3$. This construction differs from that before described, in that the truck-driving sprockets S are secured to the hubs of the rear wheels C' instead of to the axle, and I preferably place one of these sprockets on each rear wheel and connect it, through a chain Q, with a wheel R on the shaft P, as described.

In Fig. 3 I have shown, conventionally, a mining-machine on the truck. There are now known several forms of these machines, each of which can be readily placed upon and transported on the truck herein described. In the one illustrated, which is designated as a whole by $B^2$, there is a bed-frame, (indicated by F,) a carriage, (indicated by G,) and a motor or engine, (indicated by H.) The power is transmitted in any of the usual ways from the motor or engine through shafting and gearing to the cutting apparatus, and also to the devices which effect the forward-and-back motion of the carriage on the bed, the motor or engine itself being secured to and adapted to travel forward with the carriage.

O designates the sprocket-wheel on one of the shafts of the motor or engine, which is connected by the chain O' with the aforesaid sprocket-wheel P' on the shaft P.

The operation of the parts of the mechanism described will be readily understood from the foregoing description and the drawings. After the machine has been moved upon the truck, through or by means of the shaft I and chain N, the sprockets O and P' are connected and the power of the motor or engine transmitted through the shaft P and sprockets R S to the truck and the machine easily transported from place to place.

What I claim is—

1. The mining-machine-propelling mechanism having in combination, a truck, a mining-machine separable from the truck, the gearing mounted on the truck, and means for detachably connecting said gearing to the gearing of the motor or engine of the mining-machine, and sprocket-chains for connecting the gearing on the truck with the truck-wheels, substantially as set forth.

2. The combination with the mining-machine having a bed, a carriage, a cutting apparatus, a motor, shaft and gearing interposed between the motor and the cutting apparatus, a detachable truck-support, a shaft mounted on the truck, a sprocket-chain connecting said shaft with the motor-gearing, two independently-mounted truck-wheels adapted to run upon a track, and two sets of devices for transmitting power from the aforesaid shaft on the truck to the said wheels independently of each other, substantially as set forth.

In testimony whereof I affix my signature in presence of two witnesses.

HENRY B. DIERDORFF.

Witnesses:
R. GUS. HUTCHINS,
CHAS. W. MILLER.